United States Patent Office 3,268,036
Patented August 23, 1966

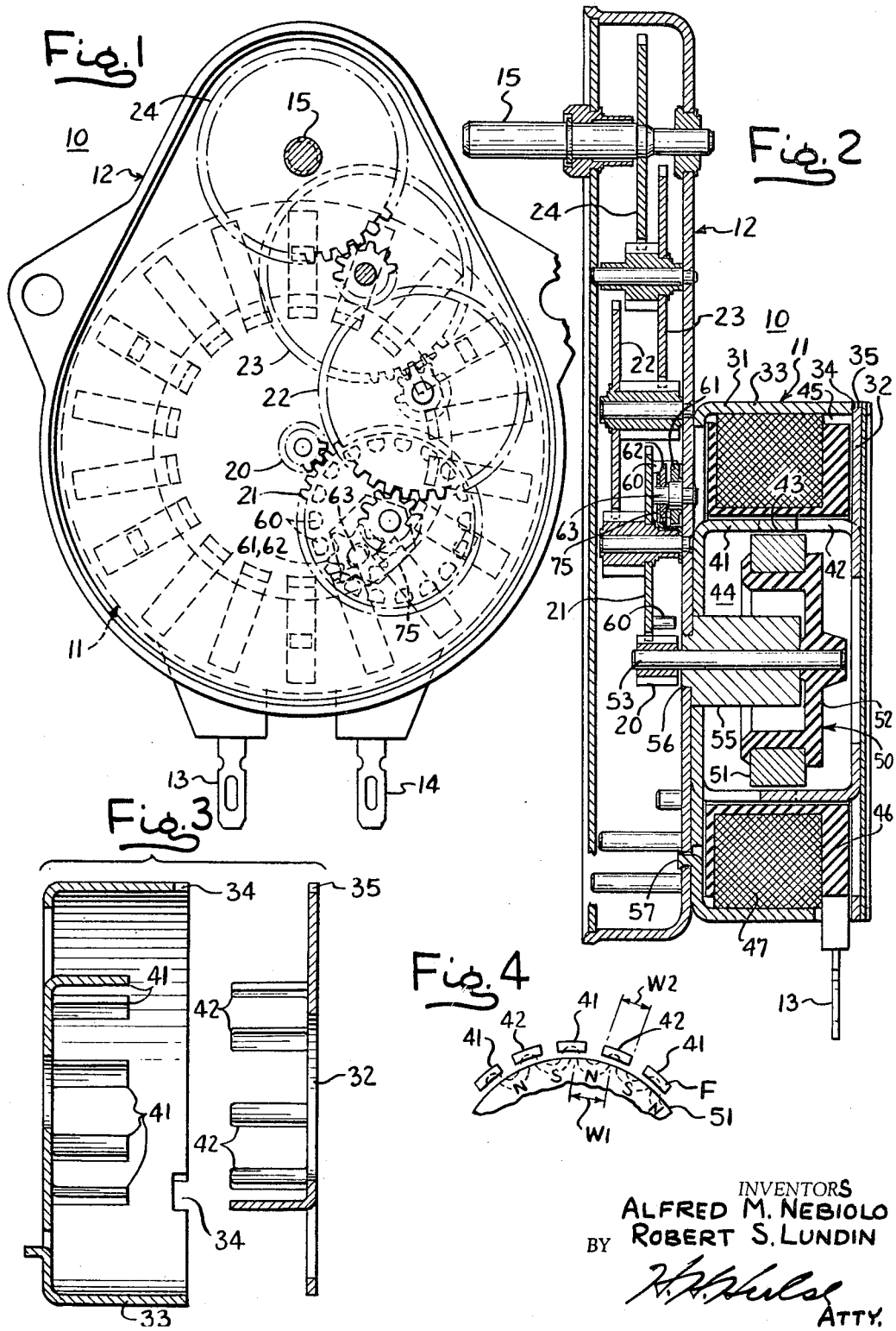

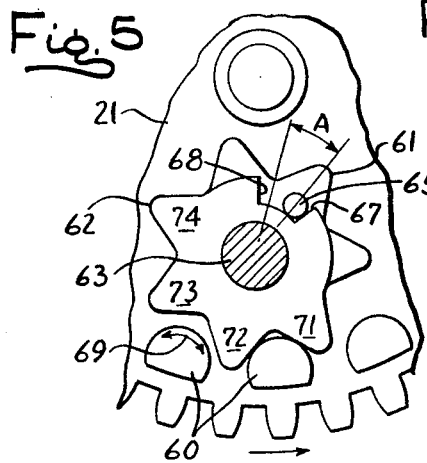
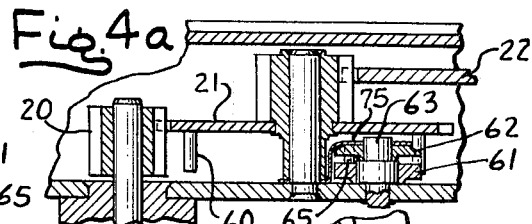
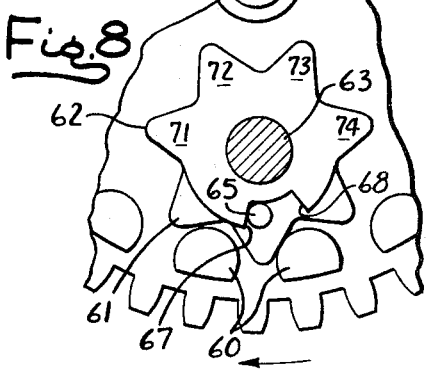
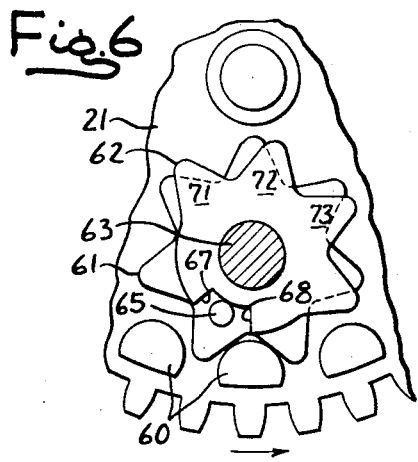
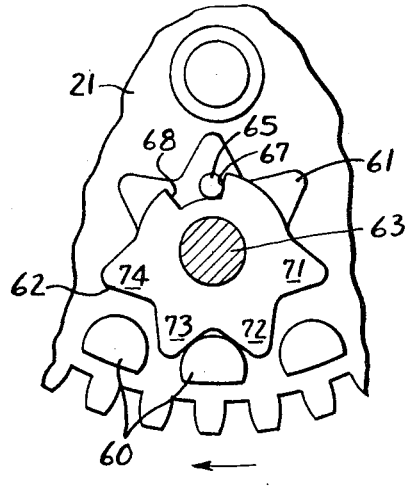
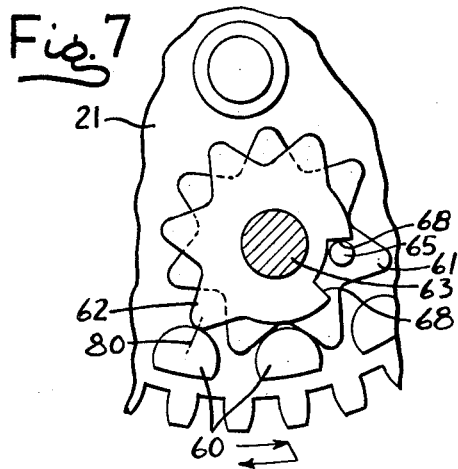

3,268,036
UNIDIRECTIONAL ROTATION CONTROL DEVICE
Alfred M. Nebiolo, Torrington, and Robert S. Lundin, Thomaston, Conn., assignors to General Time Corporation, New York, N.Y., a corporation of Delaware
Original application Sept. 13, 1962, Ser. No. 223,387. Divided and this application Aug. 3, 1965, Ser. No. 479,045
8 Claims. (Cl. 188—82.1)

The present application is a divisional application based on the copending application of Alfred M. Nebiolo and Robert S. Lundin, Seral No. 223,387, filed September 13, 1962, now abandoned.

The present invention relates to self-starting motor driving arrangements and more particularly to a synchronous, unidirectional A.-C. driving device for timers, cycling mechanisms and the like.

Synchronous A.-C. motors of the conventional self-starting type have sufficient power for driving clocks, light duty timing switches and the like but have such limited torque that they cannot be used for the cycling of the heavier switches and other equipment used in the automatic control field. Nor is it practical to achieve the greater torque simply by scaling up the size of a low power unit.

It is a general aim of the present invention to provide a combined synchronous motor and "no-back" assembly which insures positive initial impulsing of the motor in either the forward or reverse direction depending upon the instantaneous polarity of the applied voltage but which, in the event of reverse rotation, efficiently utilizes the energy of the initial impulse to produce rotation in the desired, forward, direction.

It is an object of the invention in another aspect to provide a synchronous A.-C. driving arrangement which is highly efficient, being free of the losses usually associated with the use of shading windings and with reliable means for insuring that the motor drives forwardly regardless of the instantaneous polarity of the applied voltage at moment of application and regardless of the position in which the parts have previously come to rest.

It is a more detailed object to provide a unidirectional A.-C. driving arrangement including a novel "no-back" mechanism which is capable of producing a positive, high energy rebound in the event of starting in the reverse direction. In this connection it is an object to provide a novel "no-back" mechanism having a number of significant advantages over conventional mechanisms of this type which generally require the holding of close tolerances for reliable operation and which suffer from the possibility of wedging or binding of the parts, particularly after the parts are worn as the result of repeated usage over a period of time. Thus it is an object to provide a "no-back" mechanism which may be inexpensively constructed and which operates reliably for a long period of time, for the life of the motor itself, without showing the effect of wear and with no tendency toward lockup or binding. This makes it possible for the present A.-C. drive assembly to be employed for commercial and military applications requiring the highest standards of reliability.

It is a related object to provide an A.-C. drive mechanism of the "no-back" type which is inherently quiet in operation.

Other objects and advantages of the invention will become apparent upon reading the attached detailed description and upon reference to the drawings in which:

FIGURE 1 is a face view, with cover removed, of a synchronous A.-C. driving arrangement constructed in accordance with the present invention.

FIG. 2 is an enlarged sectional view taken substantially along the line 2—2 in FIG. 1, here depicting the apparatus with the gear shafts in alignment and with the star wheels rotated so as to be visible along the section line.

FIG. 3 is an exploded view showing the motor side plates and the poles integral therewith.

FIG. 4 shows the relative position of the rotor and stator poles under the "at rest" condition prior to application of power.

FIG. 4a is a fragmentary view, in elevation, of the drive and sector wheels.

FIG. 5 is a fragmentary stop motion view showing the phasing of the star wheels at the beginning of a reverse impulse.

FIG. 6 is a stop motion view showing the sector wheel slipping backwardly relative to the drive wheel.

FIG. 7 is a stop motion view showing the interfering impact between teeth on the drive wheel and rack respectively.

FIG. 8 shows the result of impulsing of the rack in the opposite or forward direction.

FIG. 9 is a view similar to FIG. 8 but showing continued rotation of the elements in the forward direction.

While the invention has been described in connection with a preferred embodiment, it will be understood that we do not intend to be limited to the particular embodiment shown but intend to cover the various alternative and equivalent constructions included within the spirit and scope of the appended claims.

Turning to FIGS. 1 and 2 of the drawings there is disclosed a synchronous A.-C. driving arrangement 10 having a motor unit 11 and attached gear case 12. Power is applied to the motor unit via terminals 13, 14 and power take-off is through a shaft 15 which may, for example, rotate at a speed of one r.p.m. While the invention is not limited to any particular output speed it may be noted that stepdown is accomplished in the present instance in four successive steps of reduction. Thus the motor pinion 20 drives a first gear 21, a second gear 22, a third gear 23 and a fourth gear 24, the latter being coupled to the output shaft 15.

Turning next to the details of the motor construction, the motor 11 has a frame or housing which includes a cup-shaped member 31 and a circular cover plate 32, the members being parallel to one another and made of magnetic material such as soft steel. For the purpose of registering the two members together, the cup member 31 has one or more notches 34 formed in its wall 33 (see FIG. 3) and the cover plate 32 is provided with registering radial extensions 35.

In carrying out the present invention the magnetic cup member 31 is provided with a series of struck-out poles 41 which are preferably die-formed and bent at 90° to the plate of parent metal as shown. All of the poles are formed symmetrically and with even spacing about the axis of the motor. Corresponding poles 42 are struck out of the cover plate 32 and are evenly interspersed between the poles 41. Thus the two sets of poles, taken together, define a cylindrical locus 43 (FIG. 2) and divide the space within the motor into a central rotor chamber 44 and an annular winding chamber 45. Inserted into the annular chamber 45 is a bobbin 46 carrying a winding 47, the ends of which are brought to the terminals 13, 14 previously referred to. The poles 41, 42 thus constitute the opposite ends of a magnetic circuit which encircles the annular winding, with the result that when the winding is supplied with alternating current the poles 41, 42 alternate between north and south polarity.

Centered within the pole structure is a rotor generally indicated at 50 having a magnetic rim 51 formed of permanently magnetic material having spots of magnetism 51N, 51S on its periphery mounted upon a hub or spider 52 which is telescoped over the end of a shaft 53. The hub 52 may be formed of plastic or any desired dimensionally stable material. The rotor shaft 53 extends through the side of the cup member 31 and into the gear casing 12 where it carries the motor pinion 20 which serves to drive the gear train. For journalling the shaft 53, the shaft is mounted in a bushing 55 which may be of sintered oil-impregnated bronze or the like. Preferably the bushing 55 is staked to the wall of the inner casing 12 as indicated at 56 in order to insure that the pinion 20 has predetermined clearance with respect to the first gear 21. For the purpose of securing the motor unit and gear unit together, back to back, the motor unit preferably includes struck-out tabs 57 which enter registering holes in the gear case and which are peened over to provide firm attachment of the two units, back to back.

In keeping with the invention, the relative widths of the poles and the spacing between them is such that the rotor, when at rest, occupies the position illustrated in FIG. 4 wherein the permanently magnetic poles are centered between the stator poles for rotation in one direction or the other depending upon the initial polarity of the applied voltage. It will be understood that the poles, N and S, of alternate north and south polarity, are in the form of permanent spots of magnetism penetrating to some radial depth within the rim 51. The particular means employed for spot-magnetization does not form a part of the present invention and is per se well known in the art. Various parameters may be adjusted in order to bring about the "at rest" pole relation illustrated in FIG. 4. Primarily it is desirable that the peripheral width of the poles on the rotor, indicated at W1 shall slightly exceed the peripheral width of the stator poles indicated at W2. This establishes a minimum reluctance condition in which the flux F appears to follow the sepentine path shown. Where the poles on the rotor are, on the contrary, of the same width or narrower than the poles of the stator, a different flux distribution is achieved with the poles tending to come to rest in alinement with one another which is undesirable in the present motor.

Thus in a practical embodiment each of the side plates may have a thickness of 0.040" which determines the radial thickness of the poles and each of the poles may have a width of 0.103". The width of the rotor poles 51N, 51S, may be approximately 10% greater than the width of the stator poles. The spacing between the stator poles may be on the order of 0.055". The struck-out poles 41, 42 preferably extend outwardly from the parent plate 0.340" to provide an axial overlap between the poles 41, 42 on the order of 0.234". While all of these dimensions are small, not much greater than those encountered in clock motor practice, nevertheless it is significant that the torque achieved by the motor described above is substantially greater than the usual clock motor, being on the order of 120 oz.-in. as contrasted with the usual rating of 6 to 30 oz.-in. in a conventional clock or timer motor.

As the ensuing description proceeds, it will become apparent to those skilled in the art that while the present invention will find particularly advantageous use with A.-C. drive motors of the type described above, the specific details of the motor construction form no part of the invention claimed herein. Rather, such details are disclosed and claimed in the copending application of Alfred M. Nebiolo and Robert S. Lundin, Serial No. 476,938, filed August 3, 1965, and assigned to the assignee of the present invention.

In accordance with one of the features of the present invention a novel "no-back" mechanism is closely coupled to the motor shaft and includes a circular rack having inwardly facing teeth cooperating with a pair of stationarily mounted star wheels with one of the star wheels having a lost motion connection with the other and having teeth about only a portion of its periphery so that, upon reverse impulsing by the rotor, obstruction occurs to provide a well defined impact causing reversal of the rotor and continued rotation in the desired direction. Referring more specifically to the drawings, it is one of the features of the present invention that the rack is formed on the first gear 21 in the form of separate teeth 60 shaped to provide a broad crown as will be discussed. Stationarily mounted adjacent the first gear 21 and within the rack teeth 60 is a first star wheel 61, which may be referred to as a "drive" wheel, and a second star wheel 62 lacking a portion of its teeth and which may be referred to as a "sector" wheel. The star wheels are both journalled for rotation side by side on a stub shaft 63 which is staked to the wall of the gear casing.

In order to provide lost motion between the two star wheels, the wheel 61 is fitted with a pin 65 and the wheel 62 is provided with a notch defining forward and reverse pin-engaging abutments 67, 68. The total angle of freedom, indicated at "A," is preferably one-half of the pitch angle between the teeth. Thus in one of the extreme positions, as illustrated in FIG. 5, the pin rests against the abutment 67 and the teeth of the two star wheels are in alinement or register with one another. At the opposite extreme, with the pin against the abutment 68, the teeth are offset to set up an obstruction.

For the purpose of providing well defined impact between the teeth of the sector wheel and the teeth of the rack, the rack teeth are preferably formed with a cylindrical surface which substantially spans the interdental space in the star wheel and which presents a broad crown so that the angle of impact is substantially radial for conserving the energy of impact and to minimize wedging effect without necessity for adhering to close tolerances. Thus it will be noted upon reference to FIG. 5, unlike the usual involute tooth construction, the present cylindrical teeth have a broad and relatively flat crown as indicated, for example, at 69. The significance of this will be apparent upon reviewing the operation of the device in connection with the stop motion views, FIGS. 5–9 inclusive. In considering these figures it will be assumed that current has been applied to winding terminals 13, 14 and that the instantaneous polarity is such as to produce a clockwise impulsing of the rotor, with the rotor being drawn to the right from the position shown in FIG. 4. Under such conditions, the first gear 21, which carries the rack, tends to rotate counterclockwise as indicated by the arrow in FIG. 5. The teeth on the sector star wheel 62 may for convenience be numbered 71–74. When the "last" tooth 74 is reached, the two star wheels are no longer driven in unison with one another. That is, the first star wheel 61 continues to rotate but the second, or sector, wheel tends to hang back so that the lost motion pin 65 leaves the end 67 of the notch as shown in FIG. 6. In order to insure that relative movement will take place between the two star wheels when the second is no longer positively driven, in other words to insure that the second star wheel will not be dragged around with the first by reason of friction between them, a friction spring 75 is provided which bears upon the second star wheel but does not apply any force to the first. The spring, which may be in the form of a simple arch of springy metal serves the additional function of keeping the second star wheel captive on the pin 63 on which it is journaled.

Consequently upon slight additional movement of the rack and the star wheel 61, the pin 65 on the latter is brought into engagement with the shoulder 68 in the notch to define a condition in which the two star wheels are out of phase with respect to one another to a maximum degree. Consequently impact occurs between the tooth 71 on the star wheel 62 and one of the teeth 60 of the rack. Because of the shape of the teeth impact occurs in a generally radial direction indicated at 80 and approximately at right angles to the engaged surfaces. Thus there is produced a well defined hammer blow in which the energy of impact is not lost to friction but is instead largely effective to produce elastic rebound of the first gear 21 and hence rebound of the rotor 50 which is closely coupled to it. The rebound connection is a direct one since, at the time of impact, the pin 65 is firmly seated against the shoulder 68 (FIG. 7). Thus the rotor is not only brought to an abrupt stop, but the energy which is stored therein due to flywheel action and the inherent resiliency of the parts, causes the rotor to rebound in the opposite or counterclockwise direction, i.e., the direction of desired rotation. This corresponds to clockwise rotation of the first gear 21. Thus the rack 60 moves to the left as viewed in FIG. 8 causing the first star wheel 61 to rotate clockwise. Since the second star wheel 62 is frictionally retained by the spring 75 separation occurs at the shoulder 68 and the pin moves around into contact with the opposite shoulder 67. Following this, both of the star wheels continue to rotate in unison and in register with one another as shown in FIG. 9 with the motor rotating in the proper direction. An automatic reversing operation has been described immediately above. Statistically one-half of the starts will produce reverse impulsing of the rotor and one-half of the starts will produce forward impulsing. Where the rotor is impulsed in the forward or desired direction it will be understood that the sequence set forth in FIGS. 5–9 does not occur and that the rotor will continue to rotate in the initial direction with the star wheels registering with one another as set forth in FIG. 9.

The particular cylindrical surface of the rack teeth has been found to produce extremely reliable reversing over long periods of time and in spite of the wear which may take place between the parts. While a cylindrical surface is preferred, nevertheless it will be understood that the invention in its broader aspects is not limited to the use of rack teeth in the shape of circular cylinders but rather contemplates the use of teeth on the star wheels and rack which depart from the usual involute outline and which are respectively sharp or "acute" and broad or "obtuse," with each obtuse tooth providing a broad crown for a desired line of impact and with avoidance of the wedging effect which characterizes, and limits, more conventional "no-back" designs. The positiveness and reliability of the "no-back" mechanism is considered to be due to the combination of the above described pole structure which provides positive impulsing, starting from the pole-centered position illustrated in FIG. 4, combined with maximum conservation of the energy impact brought about by the broad crown tooth construction. Thus the device is capable of positive reversal even though the rotor may rotate through only a relatively small angle in the reverse direction prior to impact. In other words, the reliability of operation does not depend upon the phase position in which the parts have previously come to rest.

Because of the fact that close tolerances need not be adhered to it is possible to manufacture the present construction at low cost. Moreover, there is a high degree of consistency from unit to unit in spite of variation in the part dimensions within the tolerance range. Thus consistent operation is achieved over long periods of time and in spite of the wear resulting from many thousands of operations.

Mounting the rack on the first gear of the train has been found to be desirable from a number of points of view. In the first place the first gear and associated star wheel form a unit which is separable from the motor and which, if desired, may be made as a separate unit for mounting in any position about the motor pinion through a 360° arc. This is to be contrasted with prior devices in which the no-back mechanism includes the motor pinion as an integral part. From an energy standpoint it is desirable to mount the rack on a member which rotates at a speed which is slower than the rotor speed so that the rotor may have opportunity to build up velocity in the reverse direction before the interfering teeth come into engagement with one another; thus the stored energy is maximized.

The gear ratio between the motor pinion and the first gear is on the order of 5:1, as shown, but this is not critical and the ratio may vary over relatively wide limits of step-down.

Since the "no-back" mechanism is coupled to, but not directly a part of, the improved motor construction, maximum flexibility of design is achieved. That is, different types of motor units and different gear trains may be employed with the "no-back" mechanism of the invention so as to provide a wide range of output characteristics.

It is found that the unit is exceedingly quiet in operation, particularly when compared to prior mechanisms of the type using ratchets or escapements. The fact that the rack rotates at a speed which is substantially slower than pinion speed contributes to the quietness. The parts employed in the above construction, particularly the circular rack, may be made of metal or a plastic-metal substitute having high elasticity and a high degree of wear-resistance.

We claim as our invention:

1. An improved rotation controlling device for insuring unidirectional rotation of a motor shaft journaled for rotation within a frame; said device comprising, in combination, a circular rack member and means for coupling said member to the shaft so that said member rotates at a speed slower than said shaft, first and second coaxial star wheels having an axis stationarily mounted with respect to the frame for meshing with the rack teeth, said second star wheel having teeth disposed about only a portion of its periphery and having a lost motion connection with respect to said first star wheel, means for rotating said star wheels in unison when the motor shaft rotates in the forward direction, said means causing said star wheels to rotate in an out-of-phase condition for obstruction with a tooth on said rack member when the motor starts in the reverse direction, the teeth on said rack member having a broad crown and the teeth on said star wheels being relatively sharp so that impact between the interfering teeth takes place in a generally radial direction substantially free of wedging action at the point of impact to provide well-defined rebound of the shaft in the direction of forward rotation.

2. An improved rotation controlling device for insuring unidirectional rotation of a rotor comprising, in combination, a frame, a circular rack member including separate circularly disposed teeth and means for coupling said member to the rotor for rotation therewith, coaxial driving and sector wheels mounted on said frame for rotation about an axis fixed with respect to said frame, said wheels having teeth meshing with teeth on said rack member, said sector wheel having a lost motion connection with respect to said driving wheel, means for rotating said driving and sector wheels in unison when the rotor rotates in a forward direction, said means causing said wheels to rotate in an out-of-phase condition for obstruction with a tooth on said rack member when the rotor starts in a reverse direction to produce a well defined impact between teeth on said sector wheel and said rack member respectively for rebound of the rotor in the forward direction of rotation.

3. An improved rotation controlling device insuring unidirectional rotation of a rotor comprising, in combination, a gear casing, a gear train mounted in said gear casing including a first speed reducing gear mounted therein for rotation about a fixed axis, means for coupling said first gear to the rotor, said first gear having a rack including inwardly facing teeth, first and second coaxial star wheels having an axis stationarily mounted within said gear casing and arranged side by side for meshing with the teeth on said rack, said second star wheel having a lost motion connection with respect to said first star wheel and having a blank sector thereon, means for rotating said star wheels in unison when said rotor rotates in a forward direction, said means causing said second star wheel to hang back with respect to said first star wheel into interfering relation for impact with a tooth on said rack member when the rotor starts in a reverse direction so that the rotor rebounds for rotation in the forward direction.

4. An improved rotation controlling device for insuring unidirectional rotation of a rotor comprising, in combination, a frame, a gear train mounted on said frame, said train including a first speed reducing gear, means for coupling said train to the rotor, said first gear having a rack formed thereon, first and second coaxial star wheels having an axis stationarily mounted on said frame for cooperation with said rack, said second star wheel having a lost motion connection with said first star wheel and having a blank sector, means for rotating said star wheels in unison when the rotor rotates in the forward direction, said means causing said star wheels to rotate in an out-of-phase condition for obstruction with a tooth on said rack when the rotor starts in the reverse direction, the teeth of said rack having a cylindrical surface for spanning the space between the teeth of said star wheels and for providing a large area for generally radial impact of the interfering teeth for positive rebound of said first gear and the rotor in the forward direction.

5. An improved rotation controlling device for insuring unidirectional rotation of a rotor comprising, in combination, a frame, a circular rack member mounted on said frame, means for coupling said member to the rotor for rotation therewith, first and second coaxial star wheels having an axis stationarily mounted on said frame for cooperation with the teeth of said rack member, said second star wheel having a lost motion connection with said first star wheel and having teeth about a portion of its periphery, means for rotating said star wheels in unison when the rotor starts to rotate forwardly, said means causing said second star wheel to hang back with respect to said first star wheel for obstruction with teeth on said rack member when the rotor starts in a reverse direction, the teeth on said rack member being in the form of peripherally disposed spaced pins dimensioned to span the space between the adjacent teeth of said star wheels and each having a cylindrical surface providing a broad crown for impact between the interfering teeth in a generally radial direction to produce a well defined rebound of the rotor in the forward direction of rotation.

6. In an A.-C. driving mechanism for timers, cycling mechanisms and the like of the class having an A.-C. drive motor including a rotor and wherein a unidirectional device is provided for regulating the direction of rotor rotation, the combination with said drive motor of a frame, a circular rack member and means for coupling said member to the rotor for rotation therewith, first and second coaxial star wheels having an axis stationarily mounted with respect to the frame for meshing with the rack teeth, said second star wheel having teeth disposed about only a portion of its periphery and having a lost motion connection with respect to said first star wheel, means for rotating said star wheels in unison when the rotor rotates in a forward direction, said means causing said second star wheel to hang back with respect to said first star wheel into an out-of-phase condition for obstruction with a tooth on said rack member when the rotor starts in the reverse direction, the teeth on said rack member having a broad crown and the teeth on said star wheels being relatively sharp so that impact between the interfering teeth takes place in a generally radial direction substantially free of wedging action at the point of impact to provide well defined rebound of the rotor in the direction of forward rotation.

7. In an A.-C. driving mechanism for timers, cycling mechanisms and the like of the class having an A.-C. drive motor including rotor poles which come to rest midway between adjacent stator poles and wherein a unidirectional device is provided for regulating the direction of rotor rotation, the combination with said drive motor of a frame, a circular rack member including separate circularly disposed teeth, and means for coupling said member to the rotor for rotation therewith, coaxial driving and sector wheels mounted on said frame for rotation about an axis fixed with respect to said frame, said wheels having teeth meshing with the teeth on said rack member, said sector wheel having a lost motion connection with respect to said driving wheel, means for rotating said driving and sector wheels in unison when the rotor rotates in a forward direction, said means causing said wheels to rotate in an out-of-phase condition for obstruction with a tooth on said rack member when the rotor starts in a reverse direction to produce a well defined impact between teeth on said sector wheel and said rack member respectively for rebound of the rotor in the forward direction of rotation.

8. In an A.-C. driving mechanism for timers, cycling mechanisms and the like of the class having an A.-C. drive motor including rotor poles which come to rest midway between adjacent stator poles and wherein a unidirectional device is provided for regulating the direction of rotor rotation, the combination with said drive motor of a frame, a circular rack member and means for coupling said member to the rotor for rotation therewith, first and second coaxial star wheels on an axis stationarily mounted on said frame for cooperation with the teeth of said rack member, said second star wheel having a lost motion connection with said first star wheel and having teeth about a portion of its periphery, means for rotating said star wheels in unison when the rotor rotates in a forward direction, said means causing said second star wheel to hang back with respect to said first star wheel for obstruction between interfering teeth on said second star wheel and on said rack member when the rotor starts to rotate in a reverse direction, the teeth on said rack member being in the form of peripherally disposed spaced pins dimensioned to span the space between the adjacent teeth of said star wheels and each having a cylindrical surface providing a broad crown for impact between the interfering teeth in a generally radial direction to produce a well defined rebound of the rotor in the forward direction of rotation.

References Cited by the Examiner
UNITED STATES PATENTS

| | | | |
|---|---|---|---|
| 396,188 | 1/1889 | Anderson | 188—82.1 |
| 1,833,159 | 11/1931 | Garnett | 74—462 |
| 2,064,699 | 12/1936 | Stahl et al. | 74—462 X |
| 2,436,231 | 2/1948 | Schellens | 310—41 |
| 2,874,809 | 2/1959 | Poole | 188—82.1 |
| 2,960,884 | 11/1960 | Hill | 74—462 |
| 3,037,400 | 6/1962 | Sundt | 74—462 X |

MILTON BUCHLER, *Primary Examiner.*

G. E. A. HALVOSA, *Assistant Examiner.*